United States Patent [19]

Fiegel

[11] 4,017,776

[45] Apr. 12, 1977

[54] REVERSIBLE SHADED POLE MOTOR AND CONTROL ARRANGEMENT THEREFOR

[75] Inventor: Josef Fiegel, Landshut, Germany

[73] Assignee: International Standard Electric Corporation, New York, N.Y.

[22] Filed: Dec. 11, 1975

[21] Appl. No.: 639,914

[52] U.S. Cl. .............................. 318/208; 310/172
[51] Int. Cl.² ........................................ H02P 1/40
[58] Field of Search .............. 318/208, 223, 225 R; 310/172

[56] References Cited

UNITED STATES PATENTS

| 1,884,115 | 10/1932 | Morrill | 310/172 X |
| 2,322,942 | 6/1943 | Lange | 318/208 |
| 2,735,056 | 2/1956 | Meijer | 310/172 X |
| 2,946,941 | 7/1960 | Jin | 310/172 X |

Primary Examiner—Gene Z. Rubinson
Attorney, Agent, or Firm—William T. O'Neil

[57] ABSTRACT

The novel reversible shaded-pole motor has a stator lamination which is symmetrical about the horizontal and vertical magnetic axes. The lamination shape corresponds to two E's placed against each other. In the center, it has a circular hole for receiving the squirrel-cage rotor. Yoke parts are placed on the open sides of the E and four like coils traversed by the yoke parts are inserted in the windows obtained at the corners of the stator lamination. Shading rings are slipped over the central short legs of the E's. For the operation of the motor in each direction of rotation, two diagonally opposed, series-connected coils are connected directly to the single-phase mains, while the other two are connected to the single-phase mains via a resistor.

7 Claims, 7 Drawing Figures

REVERSIBLE SHADED-POLE MOTOR AND CONTROL ARRANGEMENT THEREFOR

The present application relates to a reversible ac motor with salient poles, such as a shaded-pole motor, with a main pole which generates a main-pole flux and from which a portion is split off for generating a rotating elliptic field by means of one or more short-circuited windings, and with a squirrel-cage rotor.

The shaded-pole motor, which is chiefly built for rated powers of up to 50 watts is considered the smallest of the induction motors. Because of its simple mechanical structure, it ensures reliable and maintenance-free operation and, therefore, is fully sufficient for most applications in spite of its mediocre electrical properties. For these reasons, shaded-pole motors are used by hundreds of thousands in a wide variety of applications, e.g. in small size blowers, slide projectors, hydraulic pumps, photostat devices and record players.

Although reversible shaded-pole motors are known, reversible drives mostly use single-phase induction motors with auxiliary winding, such as capacitor motors, in spite of the fact that a reversible shaded-pole motor is especially well suited for operation in both directions of rotation with high switching rate because it has very favorable short-circuit properties.

Reversible shaded-pole motors are known (cf. a book by Cyril G. Veinott entitled "Fractional and Subfractional Horsepower Electric Motors", 3rd edition, pp. 208–210) which have a main winding, setting up a main-pole flux, and — instead of one or more fixed short-curcuited windings — four small coils which set up a shaded-pole flux; for each direction of rotation, two diagonally opposed, series-connected coils being short-circuited. The known reversible shaded-pole motor has a stator lamination consisting of approximately O-shaped metal sheets, and one of the longer legs of the core has a hole suitable for receiving the rotor. In addition, the same leg is "feathered" in the area of the hole for the reception of the switchable coils for producing the shaded-pole flux. Thus, the known reversible shaded-pole motor has a complicated stator core, both from the point of view of manufacture and electromagnetically. The manufacture and the assembly of the four small coils raise the price of such a motor. Due to the large holes in the stator core, the air-gap field becomes very inhomogeneous and has a large harmonic content. This results in a poor utilization of the core cross-section and in a deterioration of the torque. These appear to be the reasons why the prior art type shade pole motor has not found the same wide use as the non-reversible shaded-pole motor.

It is therefore the object of the invention to provide a reversible shaded-pole motor which had the good mechanical and electrical properties of the non-reversible shaded-pole motor and, therefore, is suited to open up new fields of application for the reversible shaded-pole motor. The novel reversible shaded-pole motor will be seen to, therefore, have a structure which ensures the desired physical properties and, at the same time, permits low-cost manufacture and manufacture of different types with optimum special properties, such as maximum starting torque or maximum rated torque, by a mere change of proportions, with the basic structure being retained.

According to the invention, this object is attained through use of a stator lamination which is symmetrical about the horizontal and the vertical magnetic axis, has the shape of two E's with the two long legs placed against each other, is provided with a central circular hole corresponding to the rotor diameter, and has shading rings placed around the central short legs of the E's. Yoke parts are placed on the open sides of the E's, such that windows remain at the corners of the stator lamination in which windows four like coils penetrated by the yoke parts are inserted of which, for one direction of rotation of the motor, two diagonally opposed, electrically series-connected coils are connected directly to the single-phase mains, while the two other diagonally opposed, electrically series-connected coils are connected to the single-phase mains via a resistor.

Further advantageous details of the invention will be apparent from the following description with reference to FIGS. 1 to 6.

DESCRIPTION OF THE PREFERRED EMBODIMENTS

Figure 1:
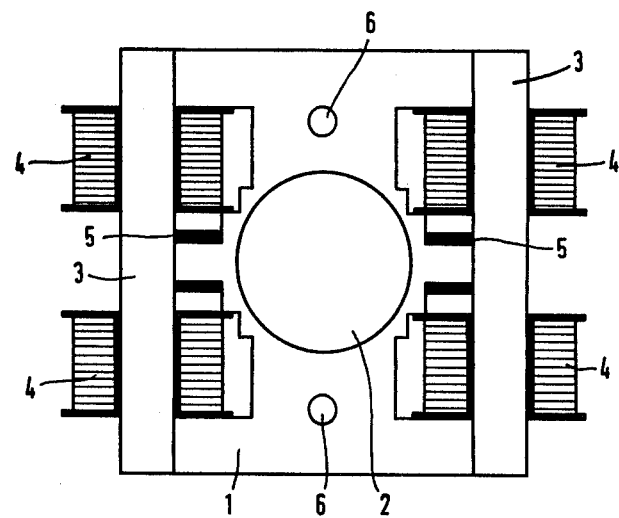
FIG. 1 shows the structure of the stator of the novel reversible shaded-pole motor.

As can be seen from FIG. 1, the stator of the novel reversible shaded-pole motor has a lamination which is symmetrical about the horizontal and the vertical magnetic axis and whose inner portion 1 has the shape of two outward facing E's whose long legs are placed (butted) against each other. This inner portion 1 of the stator lamination has a central circular opening 2 for receiving the rotor (not shown). Placed on the outward facing open sides of the E's are yoke parts 3, whereby four windows are obtained in the stator lamination. Inserted in these windows are four like coils 4 wound onto coil forms. Shading rings 5 are slipped over the central short legs of the E, and the holes 6 are provided for mounting the bearing brackets (not shown) supporting the rotor.

Figure 4:
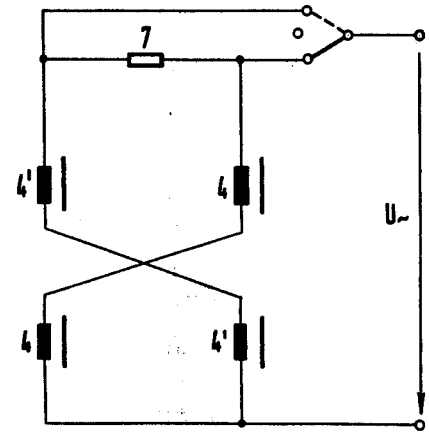
FIG. 4 shows an embodiment of the electrical circuit of the novel motor.

The coils are connected to the single-phase mains U as shown in FIG. 4. Pairs of diagonally opposed coils, namely of one pair the coils 4' of the other pair, and 4, are electrically connected in series. For operating the novel reversible shaded-pole motor in one direction of rotation, one pair of coils (coils 4 in FIG. 4) is connected directly to the singlephase mains, while the other pair of coils (coils 4' in FIG. 4) is connected to the single-phase mains via the resistor 7. Accordingly, with the switch positioned as in FIG. 4, the connection of the novel motor to the single-phase mains corresponds to one direction of rotation. If the switch shown in FIG. 4 is switched from the position shown to the position indicated by the broken line, the motor will run in the other direction of rotation.

Figure 2:
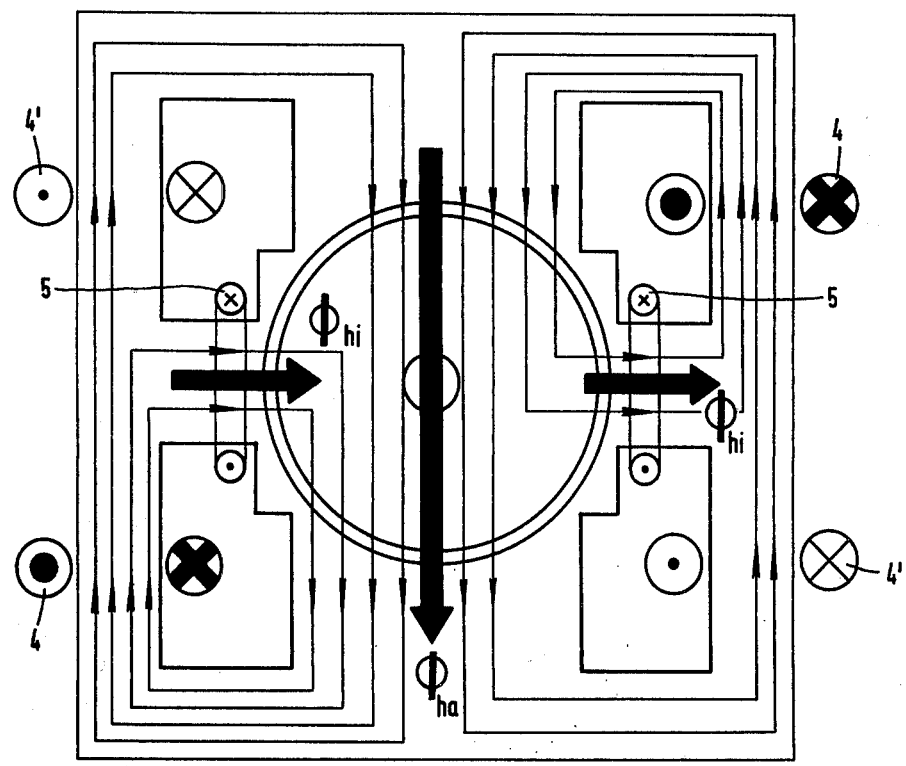
FIG. 2 shows the magnetic field pattern in the novel motor for one direction of rotation.

Single-phase induction motors are generally reversed by changing the direction of one out of two magnetic fields, it being insignificant whether the direction of the main field or of the auxiliary field is reversed. In the case of the novel reversible shaded-pole motor, the direction of the auxiliary field is reversed. The distribution of the main and auxiliary fields for the coil configuration of FIG. 4 is shown in FIG. 2 with directional arrows.

The mechanical design of the motor is such that the magnetic circuit is symmetrical about the two magnetic axes. The two magnetic axes are defined as "main axis" — this is the magnetic axis below the main poles — and "cross axis" — this is the magnetic axis below the auxiliary poles. Along the circumference of the rotor, two main poles and two auxiliary poles are arranged symmetrically, with the ratio of the main pole arc to the auxiliary pole arc being 2:1. Each complete pole pitch thus comprises one main and one auxiliary pole.

The pole windows of two diametrically opposed field coils are traversed by equally strong, but oppositely directed magnetic fields, so that an alternating flux of equal polarity and equal density is set up in the main poles. Part of the main-pole flux $\phi_{ha}$ is split off via the auxiliary poles. This split-pole flux is weakened by the shading rings on the auxiliary poles due to the induction effect and shifted so as to lag in phase behind the main-pole flux. Together with the main alternating field, this time shift of the auxiliary alternating field $\phi_{hi}$ sets up a rotating elliptical field which exerts a torque on the rotor.

To intensify the air-gap induction and, consequently, the magnetic alternating flows, all four coils are used to obtain a strong energization of the main pole and of the auxiliary pole. The connection of the four energizing coils and the peculiar generation of the magnetic flux are such that any strengthening of the field of one pole is at the expense of the field of the other pole, i.e., if the field of the main hole is strengthened, the field of the auxiliary pole will be weakened and vice versa. To develop a strong torque, however, both magnetic fields must be strengthened, and the angle by which their time phases differ must be as large as possible.

In the present case, this is achieved by connecting a series resistor into the exciter circuit and by the fact that both partial fields below the main pole geometrically add up to the main field, while below the auxiliary pole the geometric difference of these partial fields is effective as an out-of-phase auxiliary field. By this measure, the split-off auxiliary-pole flux, previously in phase with the main-pole flux, is shifted so as to lag in time phase behind the flux of the main-pole field already before being weakened and shifted by the short-circuited winding.

The out-of-phase auxiliary-pole flux is again weakened by the short-circuited winding, and its phase is again shifted to lag that of the main-pole flux. This results in a considerable increase in rated torque. As in the conventional shaded-pole motor, a stamped bridge portion with the same magnetic properties is located between the main pole and the auxiliary pole.

Without any change in its basic design and merely by a change in the proportions of its component parts, the novel reversible shaded-pole motor can be designed so as to have optimum properties for the respective application, e.g. maximum starting torque or maximum rated torque. If maximum starting torque is required, for example, strong main and auxiliary-pole fields must be ensured, the shortcircuited winding and the series resistor must have optimum values, and the motor must have a high rotor fundamental current with a high active component (favorable ratio of ohmic to inductive rotor impedance).

For a strong rated torque and a high rated speed, strong main and auxiliary-pole alternating fields, a weaker design of the short-circuited windings, which, as a result of the rotational emf, prevents a cross field generated by the rotor from being damped too much, an optimum value of the series resistor, an as small a rotor resistance as possible, and a large number of rotor slots with optimum cross-section are necessary.

Figure 3:
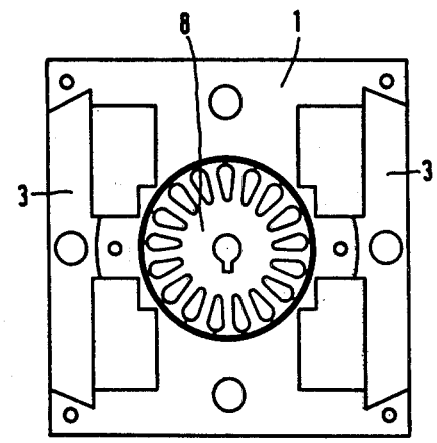
FIG. 3 shows the stator lamination shape used in one embodiment of the novel motor.

FIG. 3 shows a lamination shape as used in one version of the novel reversible shaded-pole motor. It comprises the inner portion 1, the yoke parts 3, and the rotor lamination 8. The ends of the yoke parts 3 are provided with a dovetail-shaped parting cut. After the machine-made coils have been slipped over the yoke parts, the latter are pressed into the inner portion 1. By the selected manner of separation, the ampere-turn (MMF) losses at the joints of the stator lamination, i.e., at the parting cuts and at the auxiliary poles, can be kept to a minimum. At the same time, a uniform airgap is achieved during series production.

Figure 5:
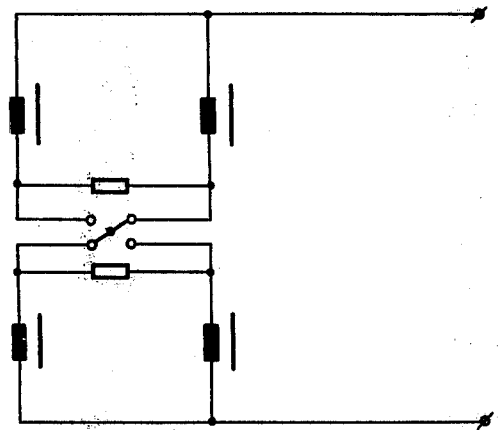
FIGS. 5 & 6 are modifications of the electrical circuit of the novel motor.
Figure 6:
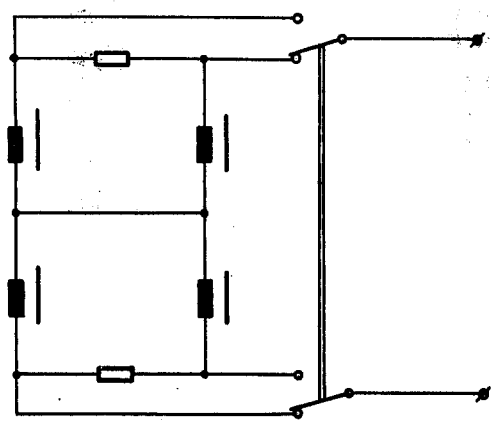

FIGS. 5 and 6 show two further external circuit arrangements for reversing the direction of the auxiliary-pole field in order to reverse the direction of rotation. In FIG. 5, the series resistor is divided into two series resistors. This circuit requires resistors with only half the power rating as compared to the circuit of FIG. 4, which reduces the expense of the circuit, by may also facilitate the accommodation of the series resistor at the motor. The reversal of the direction of rotation is effected with a double-pole changeover switch.

Another circuit arrangement for reversing the direction of rotation with two series resistors of half the power rating and with a double-pole changeover switch is shown in FIG. 6. In this embodiment, the two adjacent coils wound onto a yoke part can be advantageously provided with a center tap. Only one hookup wire is required for the diagonal connection.

The novel reversible shaded-pole motor has additional advantages over prior art shaded-pole motors and the capacitor motor with salient poles.

Through the special connection of the four energizing coils 4 and 4' to the same supply voltage, and since the pole windows contain only one single coil, phase isolation compulsory in the capacitor motor because of the high auxiliary-winding voltage caused by the capacitor, can be dispensed with. This permits a better electrical utilization of the pole window.

In case of frequent reversals of the direction of rotation, the use of a series resistor instead of a capacitor reduces contact wear at the changeover switch and results in better noise suppression. Disconnection of the motor from the mains causes less sparking than in the capacitor motor. By the special connection of the energizing coils, the magnetic energy stored in the motor is broken down by the series resistors during changeover. This fact cuts down the reversal time of the rotor.

Compared with the prior art shaded-pole motor, the novel motor has short-circuited windings which can be manufactured in a simple manner as stampings. These stampings are made from copper sheet and simply slipped over the auxiliary pole. The ends of the short-circuited windings need not be interconnected.

Figure 7:
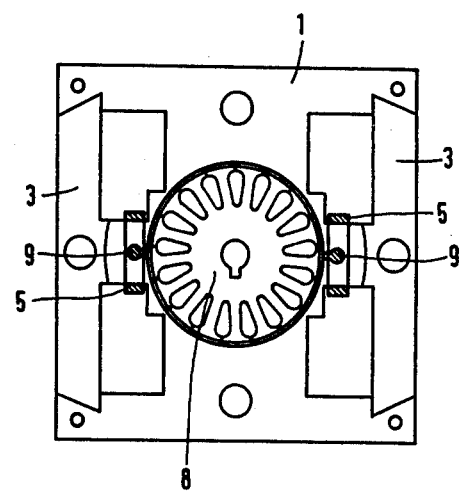
FIG. 7 shows special features of the short-circuited winding of the novel motor.

The starting torque of the novel motor can be increased by the measure shown in FIG. 7. In the middle of each of the two auxiliary poles, there is provided a circular groove with a corresponding opening toward the rotor hole; each of these grooves receives a copper bar 9 which is welded to the slipped-on short-circuited windings at both ends.

The copper bars divide the short-circuited windings 5 into two halves whereby the windings' impedance is considerably reduced. This measure causes a sharp increase in the current induced in each half of the short-circuited winding, which is immediately adjacent to the energizing coil connected directly to the mains.

Less current is induced in the other half of the short-circuited winding as a result of the uneven induction distribution below the auxiliary pole.

The unbalanced magnetic load on the two halves of the short-circuited winding and the impedance reduced by the parallel connection of the copper bar cause an increase in the time phase displacement angle of the auxiliary field when the rotor is at a standstill.

What is claimed is:

1. A reversible, salient-pole, AC motor of the shaded-pole type, having a squirrel-cage rotor and comprising:
    a magnetic circuit symmetrical about two mutually orthogonal axes in a plane normal to the shaft of said rotor, said magnetic circuit including a lamination stack of geometrically regular outer perimeter with four equal and like-shaped windows, one of said windows being in each quadrant of said plane, said lamination stack having a centrally located opening through which said rotor is rotationally installed;
    a pair of salient main magnetic poles formed by said lamination stack, said main poles of said main pair being diametrically opposite abutting said central opening;
    a pair of salient auxiliary magnetic poles formed by said lamination stack, said auxiliary poles of said auxiliary pair being diametrically opposed abutting said central opening, said auxiliary poles being orthogonally oriented in said plane with respect to said main poles;
    shading rings placed about at least one of said salient auxiliary poles adjacent said central opening;
    an arrangement of a plurality of electromagnet coils separately magnetically coupling to four discrete portions of said magnetic circuit, said discrete portions being between said outer perimeter of said stack and said windows;
    and a control circuit for energizing a first fraction of said electromagnet coils in a first predetermined relationship with respect to said magnetic circuit directly from the power mains and for energizing a second fraction of said electromagnet coils from said power mains through at least one series resistance, for causing rotation of said rotor in a first direction, said control circuit being controllable to alternatively energize said second fraction of said electromagnet coils directly from said power mains and said first fraction of said electromagnet coils from said mains through said series resistance to produce rotation of said rotor in the reverse direction.

2. Apparatus according to claim 1 in which the laminations of said stack are such that said windows generally rectangular and have a greater maximum dimension in one direction in said plane than in the orthogonal direction, and said outer perimeter is substantially rectangular, said auxiliary poles thereby being of smaller cross-section than said main poles.

3. Apparatus according to claim 2 in which said coil arrangement comprises four discrete coils, one each coupling to a leg of said magnetic circuit lying between a greater dimension of each window and said stack outer perimeter, said first and second fractions of said electromagnet coils each comprising a pair of diagonally opposite coils, the effective mangeto-motive forces being applied to said rotor via both said main and auxiliary poles to provide a magnetic field rotating in a sense determined by selection between said energizing arrangement of said coils and said alternate energizing arrangement provided by said control circuit.

4. Apparatus according to claim 2 which said lamination stack has the shape of two E laminations stacked back-to-back forming a main lamination part, and yoke parts placed so as to close the resulting outward facing openings, said centrally located hole being substantially at the geometric center of said stack of substantially rectangular outer perimeter.

5. Apparatus according to claim 4 in which said yoke parts are elongated pieces of trapezoid shape having their short sides tapered outwardly in said plane, and in which the outward E legs of said main lamination parts mating therewith are correspondingly notched, producing a mechanically interlocked stack arrangement.

6. Apparatus according to claim 1 in which said shading rings are rectangular sleeves of a high conductivity material.

7. Apparatus according to claim 6 in which said shading rings are substantially bisected by conductive bars, said stack containing a groove adjacent to each of said auxiliary poles for accommodating said bars.

* * * * *